(12) United States Patent
Weil et al.

(10) Patent No.: US 8,293,426 B2
(45) Date of Patent: Oct. 23, 2012

(54) CASSETTES FOR SOLID-OXIDE FUEL CELL STACKS AND METHODS OF MAKING THE SAME

(75) Inventors: K. Scott Weil, Richland, WA (US); Kerry D. Meinhardt, Kennewick, WA (US); Vincent L. Sprenkle, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 986 days.

(21) Appl. No.: 12/242,165

(22) Filed: Sep. 30, 2008

(65) Prior Publication Data

US 2010/0081026 A1    Apr. 1, 2010

(51) Int. Cl.
  *H01M 8/02*   (2006.01)
  *H01M 8/12*   (2006.01)
(52) U.S. Cl. .................... 429/519; 429/510; 429/522
(58) Field of Classification Search ........... 429/400–535
  See application file for complete search history.

(56) References Cited

U.S. PATENT DOCUMENTS

| 7,306,872 | B2 | 12/2007 | Haltiner, Jr. et al. | |
| 2003/0064269 | A1* | 4/2003 | Kelly et al. | 429/34 |
| 2003/0077498 | A1* | 4/2003 | Cable et al. | 429/32 |
| 2004/0028994 | A1* | 2/2004 | Akikusa et al. | 429/44 |
| 2005/0026028 | A1 | 2/2005 | Ouchi et al. | |
| 2005/0136312 | A1* | 6/2005 | Bourgeois et al. | 429/32 |
| 2006/0147782 | A1* | 7/2006 | Reisdorf et al. | 429/34 |

FOREIGN PATENT DOCUMENTS

| EP | 1211742 A | 5/2002 |
| EP | 1211742 A2 | 5/2002 |
| EP | 1401040 A | 3/2004 |
| EP | 1401040 A1 | 3/2004 |
| EP | 1775790 A | 4/2007 |
| EP | 1775790 A1 | 4/2007 |
| WO | 02/05368 A1 | 1/2002 |
| WO | 0205368 A | 1/2002 |
| WO | 03036745 A | 1/2003 |
| WO | 03/036745 A2 | 5/2003 |
| WO | 2006/014155 A | 2/2006 |
| WO | 2006/014155 A1 | 2/2006 |
| WO | WO 2006/044593 A2 * | 2/2006 |

OTHER PUBLICATIONS

PCT International Search Report and Written Opinion.

* cited by examiner

*Primary Examiner* — Basia Ridley
*Assistant Examiner* — James Lee
(74) *Attorney, Agent, or Firm* — Allan C. Tuan

(57) ABSTRACT

Solid-oxide fuel cell (SOFC) stack assembly designs are consistently investigated to develop an assembly that provides optimal performance, and durability, within desired cost parameters. A new design includes a repeat unit having a SOFC cassette and being characterized by a three-component construct. The three components include an oxidation-resistant, metal window frame hermetically joined to an electrolyte layer of a multi-layer, anode-supported ceramic cell and a pre-cassette including a separator plate having a plurality of vias that provide electrical contact between an anode-side collector within the pre-cassette and a cathode-side current collector of an adjacent cell. The third component is a cathode-side seal, which includes a standoff that supports a cathode channel spacing between each of the cassettes in a stack. Cassettes are formed by joining the pre-cassette and the window frame.

11 Claims, 2 Drawing Sheets

CASSETTES FOR SOLID-OXIDE FUEL CELL STACKS AND METHODS OF MAKING THE SAME

STATEMENT REGARDING FEDERALLY SPONSORED RESEARCH OR DEVELOPMENT

This invention was made with United States Government support under Contract DE-FC2602NT41246 awarded by the U.S. Department of Energy. The Government has certain rights in this invention.

BACKGROUND

Fuel cells combine hydrogen and oxygen to produce electricity. A particular configuration of fuel cells, known as solid-oxide fuel cells (SOFC), utilize a solid, oxide electrolyte through which oxygen anions migrate. A typical SOFC stack assembly includes fuel cell subassemblies that are electrically connected in series through interconnects. The subassemblies are repeated units in the stack and can each comprise a ceramic cell having a solid-oxide electrolyte layer coated with anode and cathode layers.

Many of the conventional designs and assembly processes can be expensive and difficult to implement. Furthermore, testing of the devices can be difficult and costly. Accordingly, SOFC modifications and designs are consistently being investigated to develop an assembly that provides optimal performance, and durability, within desired cost parameters. In these investigations various features must be explored and considered, as well as the related trade-offs made. What is needed is a design that can provide desired levels of performance, function for a desired period of time and be created in a cost effective way with cost effective materials. The embodiments of the present invention meet these needs.

Additional advantages and novel features of the present invention will be set forth as follows and will be readily apparent from the descriptions and demonstrations set forth herein. Accordingly, the following descriptions of the present invention should be seen as illustrative of the invention and not as limiting in any way.

SUMMARY

The present invention is a repeat unit in a solid oxide fuel cell (SOFC) stack. The repeat unit comprises a SOFC cassette and is characterized by a three-component construct. The three components include an oxidation resistant window frame hermetically joined to an electrolyte layer of a multilayer, anode-supported ceramic cell, a pre-cassette comprising a separator plate having a plurality of vias that provide electrical contact between an anode-side collector within the pre-cassette and a cathode-side current collector of an adjacent cell. The third component is a cathode-side seal, which comprises a standoff that supports a cathode channel spacing between each of the cassettes in a stack. Cassettes are formed by joining the pre-cassette and the window frame.

In some embodiments, the separator plate can further comprise an anode spacer that is formed out of the separator plate. For example, the anode spacer can be stamped into a metal separator plate having an insulating layer that can electrically isolate the separator plate from the window frame and/or the ceramic cell. Alternatively, the anode spacer can be applied as part of a window-frame-to-separator-plate seal. For example, the sealing material can itself serve as the anode spacer, electrically insulating the separator plate from the window frame. In yet another embodiment, the anode spacer can be fabricated with an insulating material. For example, the anode spacer can comprise a molded ceramic standoff, or, in instances where the separator plate comprises an insulating material, the anode spacer can be formed as part of the separator plate.

The anode-side current collector, the cathode-side current collector, or both, can comprise a metal-coated, non-metal foam, felt, or mesh. In a particular instance, the foam, felt, or mesh comprises a high-temperature-resistant alloy and is coated with an electrically conductive coating, such as a silver coating. A particularly well-suited high-temperature-resistant alloy is KANTHAL, which is an alloy comprising iron, chromium, and aluminum. While suitable current collectors are not limited to KANTHAL or even to alloys, the current collectors preferably comprise materials that are creep resistant and are also oxidation resistant or form oxidation resistant scale.

In preferred embodiments, the cathode-side seal comprises a Ag—CuO air braze filler metal. The braze filler metal can be applied to either side of an electrically insulating spacer, or it can be applied to an insulating layer on the window frame, the separator plate, or both. Alternatively, the cathode-side seal can comprise a glass-ceramic material that contains a discrete internal spacer serving as the standoff. In yet another embodiment, rather than discrete internal spacers, the glass-ceramic material can comprise a modifier that raises the material's viscosity such that the glass-ceramic material will set at a pre-determined thickness. In still other embodiments, the cathode-side seal can comprise a mica-based spacer that forms a hermetic seal when the stack is placed under a load throughout operation.

The anode standoff, according to preferred embodiments, can be a stamped form in the metal window frame of one cassette or in the separator plate of an adjacent cassette.

The purpose of the foregoing abstract is to enable the United States Patent and Trademark Office and the public generally, especially the scientists, engineers, and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Various advantages and novel features of the present invention are described herein and will become further readily apparent to those skilled in this art from the following detailed description. In the preceding and following descriptions, the various embodiments, including the preferred embodiments, have been shown and described. Included herein is a description of the best mode contemplated for carrying out the invention. As will be realized, the invention is capable of modification in various respects without departing from the invention. Accordingly, the drawings and description of the preferred embodiments set forth hereafter are to be regarded as illustrative in nature, and not as restrictive.

DESCRIPTION OF DRAWINGS

Embodiments of the invention are described below with reference to the following accompanying drawings.

DETAILED DESCRIPTION

The following description includes the preferred best mode of one embodiment of the present invention. It will be clear from this description of the invention that the invention is not limited to these illustrated embodiments, but that the invention also includes a variety of modifications and embodiments thereto. Therefore the present description should be seen as illustrative and not limiting. While the invention is susceptible of various modifications and alternative constructions, it should be understood, that there is no intention to limit the invention to the specific form disclosed, but, on the contrary, the invention is to cover all modifications, alternative constructions, and equivalents falling within the spirit and scope of the invention as defined in the claims.

Figure 1A:
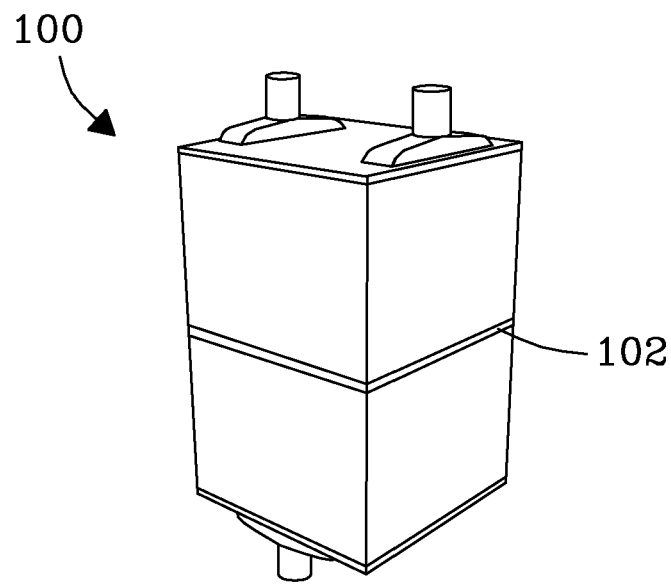
FIG. 1 is an illustration depicting a SOFC cassette from a fuel cell stack assembly according to one embodiment of the present invention.
Figure 1B:
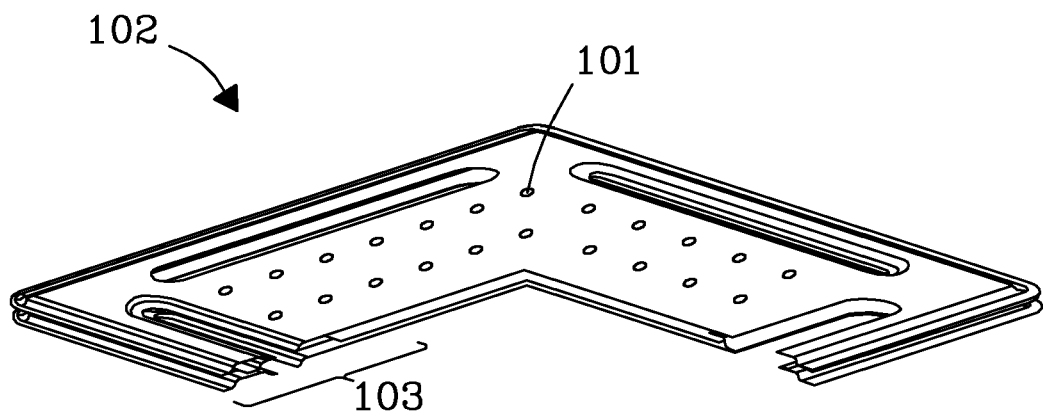
Figure 2:
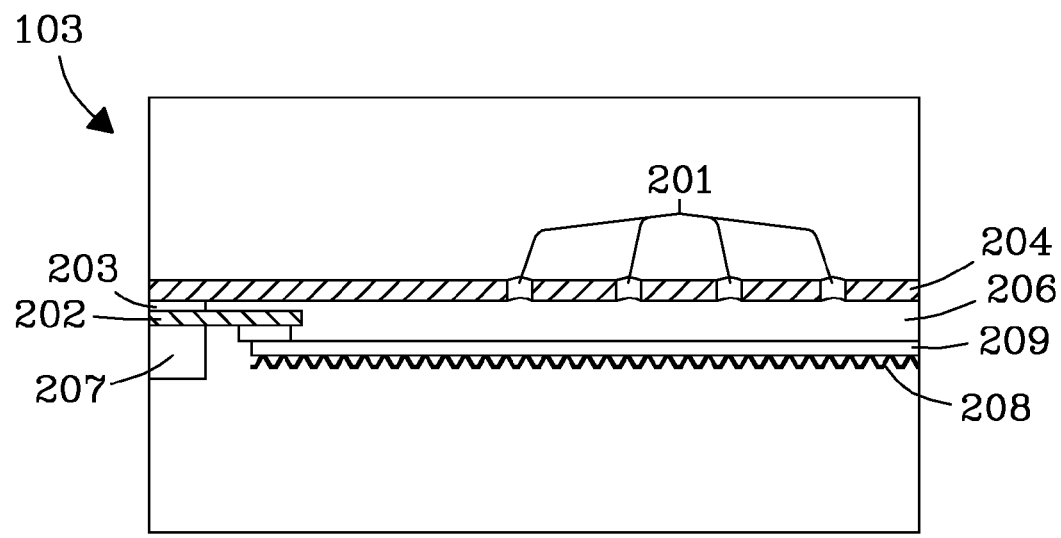
FIG. 2 is a perspective side view of a cross-section of a SOFC cassette according to one embodiment of the present invention.
Figure 3:
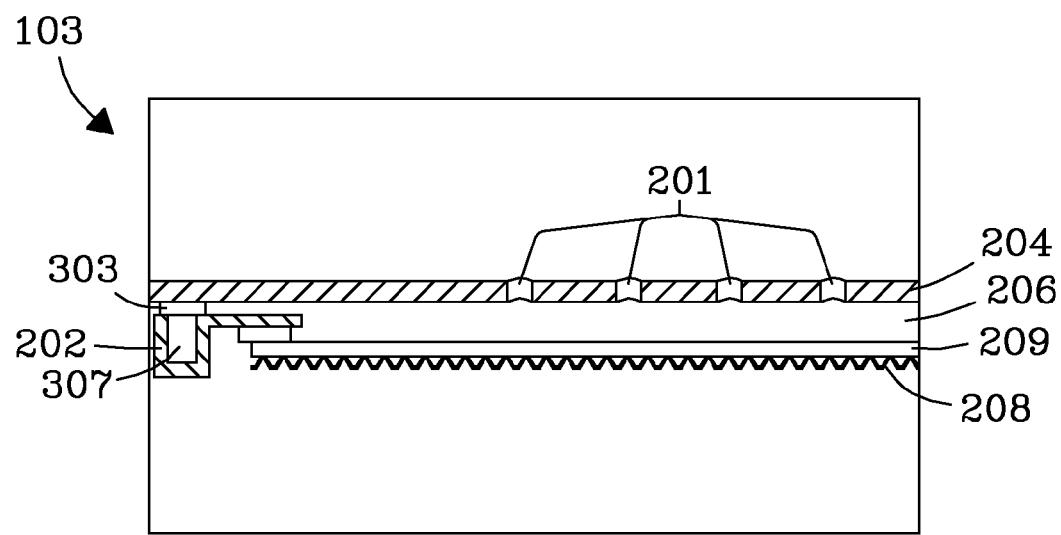
FIG. 3 is a perspective side view of a cross-section of a SOFC cassette according to one embodiment of the present invention.

FIGS. 1-3 show a variety of embodiments of the present invention. Referring first to FIG. 1, a view of one embodiment of the present invention depicts a single cartridge from a fuel cell stack assembly. A plurality of these cassettes are interconnected, stacked, and sealed to form a fuel cell stack assembly. Electrical connections between cassettes are made through the vias. The single cassette, as illustrated, has been cut away to expose the ceramic cell within. FIGS. 2 and 3 contain detailed cross-section views of region 103, the three-component construction utilized as the repeat unit in the stack assembly according to preferred embodiments of the present invention.

Referring to FIGS. 2 and 3, a yttrium-stabilized zirconia side of a positive electrode/solid electrolyte/negative electrode-structured (PEN-structured) ceramic cell 209 is sealed to a thin oxidation-resistant window frame 202. A pre-cassette is fabricated including a separator plate 204 having vias 201 and an anode spacer 203, 303. Circular patches of silver ink are placed onto each via 201 to facilitate joining to an anode current collector 206. The anode current collector can comprised a woven metal mesh, which is preferably nickel. Circular patches of nickel paste can be placed onto the anode surface to facilitate electrical and mechanical bonding of the anode current collector and the anode side of the ceramic cell 209. Alternatively, a metal foam or grid, preferably nickel, can suitably replace the mesh as the anode current collector. Once the mesh is placed inside the anode cavity, the window frame 202 is joined to the surface of the anode spacer 203 on the pre-cassette, thereby forming the cassette that will be interconnected, stacked and sealed to form the stack. Joining can be carried out by brazing using an air braze filler metal such as Ag—CuO, by welding, by glass sealing, or by mica sealing in conjunction with appropriately loading the stack after fabrication.

A cathode interconnect 208 comprising a silver-coated piece of compliant mesh, felt, foam, or stamping is added such that the electrical pathway between adjacent cells starts at the cathode surface of one PEN-structured cell 209, which can be screen-printed with a Ag or Ag—CuO grid, continues through the metallized cathode grid to a silver paste interconnection and the silver coating of the cathode current collector to a silver patch on the cathode side of the vias in the adjacent cassette. The pathway continues through the vias and a silver patch on the anode side of the vias to the anode current collector, and through the nickel interconnection paste to the anode of the cell in the adjacent cassette.

A cathode spacer 207, 307 is added between each cassette and supports a uniform cathode channel spacing. Uniformity of the channel spacing helps to ensure even back pressure and air flow distribution throughout the stack. The cathode current collector 208 is placed inside the cathode channel spacing. Preferred embodiments of the cathode current collector comprise an oxidation resistant metal foam, felt, mesh, or stamping over coated with silver. Other embodiments include an oxidation resistant metal foam, felt, mesh, or stamping over coated with a non-silver conductive material or a non-metal foam, felt, or mesh coated with silver or a non-silver conductive material. The foam, felt, or mesh is preferably made of a high-temperature-resistant material that is resistant to oxidation. One example of such a material is silver-coated KANTHAL, which is an iron, chromium, aluminum alloy. In preferred embodiments, the alloy comprises a minimum of iron, 17% chromium, and greater than 3% Al so that upon air oxidation the alloy forms an adherent alumina scale. Additional elements such as yttrium and titanium can be added as well.

A silver-coated non-metal can have the advantages of being resistant to oxidation, rigid, and lower in cost compared to a solid silver current collector. As described above, interconnection can be made between the cathode, the current collector, and the vias using a wet silver coating or paste. The cassettes are stacked one upon another, fixtured with a sealing material to ensure proper contact between cassettes, and heated to hermetically seal the stack.

The anode spacer 203 in FIG. 2 can comprise an insulating material fabricated into a discrete standoff. The standoff can then be joined to the separator plate and the window frame, using, for example, a braze or joining material or by welding. In another embodiment, the standoff can be applied as part of the window-frame-to-separator-plate seal. For example, glass/insulating beads of a pre-determined size can be added to the sealing material, which beads function as standoffs that also serve to electrically isolate the separator plate and the window frame/ceramic cell. Alternatively, as depicted in FIG. 3, the anode spacer 303 can be formed out of the separator plate. For example, a metal separator plate can be stamped to form the spacer. An insulating sealing material can then be used to join the surface of the stamped anode spacer 303 to the window frame. In some instances, an insulating layer can be formed on the separator plate, which would allow the separator plate and the window frame to be welded together while remaining electrically isolated from each other. In yet another configuration, the separator plate can comprise an insulating material, such as a ceramic, and the anode spacer can be molded or formed as part of the ceramic separator plate.

The cathode spacer 207 in FIG. 2 can comprise an insulating material fabricated into a discrete standoff. The standoff can then be joined to the window frame using, for example, a braze or joining material. In another embodiment, the standoff can be applied as part of a seal joining the cathode side of one cassette to the separator plate of an adjacent cassette. For example, glass/insulating beads of a pre-determined size can be added to the sealing material, which beads function as standoffs that also serve to electrically isolate one cassette from another. The necessary electrical connections can be made through the vias and interconnects. Alternatively, as depicted in FIG. 3, the cathode spacer 307 can be formed out of the window frame. For example, a metal window frame can be stamped to form the spacer. An insulating sealing material can then be used to join the surface of the stamped cathode spacer 307 to the adjacent cassette. In some instances, an insulating layer can be formed on the window frame, which would allow the window frame and the adjacent cassette to be joined together with a conductive sealing material while remaining electrically isolated from each other. In yet another configuration, the window frame can comprise an insulating material, such as a ceramic, and the cathode spacer can be molded or formed as part of the ceramic window frame.

While a number of embodiments of the present invention have been shown and described, it will be apparent to those skilled in the art that many changes and modifications may be made without departing from the invention in its broader aspects. The appended claims, therefore, are intended to cover all such changes and modifications as they fall within the true spirit and scope of the invention.

We claim:

1. A solid-oxide fuel cell (SOFC) repeat unit in a SOFC stack, the repeat unit characterized by a three-component construct comprising:
    an oxidation-resistant metal window frame hermetically joined to an electrolyte layer of a multilayer, anode-supported ceramic cell;
    a pre-cassette comprising a metal separator plate having an insulating layer electrically isolating the separator plate from the window frame and from the ceramic cell, the metal separator plate having a plurality of vias that provide electrical contact between an anode-side current collector within the pre-cassette and a cathode-side current collector of an adjacent cell; and
    a cathode-side seal;
wherein the metal window frame is joined to the pre-cassette to form an SOFC cassette and the cathode-side seal comprises a standoff that supports a cathode channel spacing between each of the cassettes in the stack.

2. The SOFC repeat unit of claim 1, wherein the separator plate further comprises an anode spacer that is formed out of the separator plate, applied as part of a window-frame-to-separator-plate seal, or fabricated with an insulating material.

3. The SOFC repeat unit of claim 1, wherein the anode-side current collector, the cathode-side current collector, or both comprise a metal-coated, metal or non-metal foam, mesh, felt, or stamping.

4. The SOFC repeat unit of claim 1, wherein the anode-side current collector, the cathode-side current collector, or both comprises a silver-coated, high-temperature oxidation-resistant alloy foam, felt, mesh, or stamping.

5. The SOFC repeat unit of claim 4, wherein the silver-coated, high-temperature-resistant alloy comprises iron, chromium, and aluminum.

6. The SOFC repeat unit of claim 1, wherein the cathode-side seal comprises a Ag—CuO air braze filler metal applied to either side of an electrically insulating spacer.

7. The SOFC repeat unit of claim 1, wherein the cathode-side seal comprises a Ag—CuO air braze filler metal applied between an insulating layer on the window frame and an insulating layer on the separator plate.

8. The SOFC repeat unit of claim 1, wherein the cathode-side seal comprises a glass-ceramic material containing a discrete internal spacer that serves as the standoff.

9. The SOFC repeat unit of claim 1, wherein the cathode-side seal comprises a glass-ceramic material having a modifier that raises the glass-ceramic material's viscosity during joining such that the glass-ceramic material sets at a pre-determined thickness.

10. The SOFC repeat unit of claim 1, wherein the cathode-side seal comprises a mica-based spacer that forms a hermetic seal when the stack is placed under a load throughout operation.

11. The SOFC repeat unit of claim 1, wherein the standoff is a stamped form in the metal window frame of one cassette or in the separator plate of an adjacent cassette.

* * * * *